United States Patent Office 2,855,443
Patented Oct. 7, 1958

2,855,443

NITROETHYLENES

Dale N. Robertson, Midland, Mich., assignor to The Dow Chemical Company, Midland, Mich., a corporation of Michigan No Drawing. Application October 18, 1956
Serial No. 616,651

6 Claims. (Cl. 260—646)

This invention relates to nitroethylenes and particularly to halonitrostilbenes having the structure

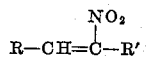

In this and succeeding formulae, R and R' each represents a member of the group consisting of aryl and haloaryl and wherein at least one of R and R' represents a haloaryl radical. The term "haloaryl" as herein employed refers to phenyl radicals which contain at least one halogen in the aromatic nucleus and which may contain, in addition, other substituents such as lower alkyl, lower alkoxy, nitro, phenyl, lower carbalkoxy and carbalkoxyalkoxy. Where there is more than one halogen, the halogen atoms may be the same or different. Examples of such radicals are 2-chlorophenyl-, 2-fluorophenyl-, 4-chloro-3-nitrophenyl-, 2,4,6-trichlorophenyl-, 4-chloro-2-methoxyphenyl-, 2-bromophenyl-, 4-bromo-2-chlorophenyl-, 4-chloro-2-methylphenyl-, 2-chloro-4-phenylphenyl-, 5-bromo-2-methoxyphenyl-, 4-bromo-2-nitrophenyl-, 3-bromophenyl-, 4-bromo-3-methoxyphenyl- and 2-iodophenyl-. The term "aryl" as herein employed refers to radicals of the benzene series and is inclusive of phenyl and substituted phenyl radicals such as ethoxycarbomethoxyphenyl-, 3-nitrophenyl-, 2,4-dimethylphenyl-, 4-ethoxyphenyl-, 3,4-dimethoxyphenyl-, 3,4-methylenedioxyphenyl-, 3-carbethoxyphenyl-, 4-tertiary-butylphenyl- and 3-phenylphenyl-.

The products of this invention are yellow or orange colored crystalline solids soluble in organic solvents such as ethanol, acetone, xylene and kerosene and substantially insoluble in water and in 10 percent aqueous sodium hydroxide solution. The products are useful as toxic ingredients in compositions adapted to be employed for the control of bacteria and fungi such as in germicidal soap compositions and in the preservation of cellulosic textiles. They are also useful as agricultural chemicals and as insecticides. In addition, these compounds are useful as chemical intermediates.

The products of this invention may be prepared by the reaction of (1) a Schiff base having the structure

R—CH=NR'' wherein R'' is a lower alkyl radical containing from 3 to 6 carbon atoms, inclusive, with (2) a nitromethane compound having the structure

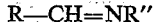

The Schiff base reactant may be prepared by condensing an appropriate aldehyde having the formula

RCHO with a primary amine having the formula

R''NH$_2$ wherein R and R'' are as above defined. It is convenient to prepare the Schiff base as a first step in the synthesis of the halonitrostilbene.

In the preferred method for carrying out this reaction, the aldehyde and a primary alkyl amine, such as normal butyl amine, are mixed in a water-immiscible organic solvent such as benzene or cyclohexane. Good results are obtained when substantially equimolar quantities of the reactants or a slight excess of the amine are employed. The resulting mixture is heated to distil out the water of reaction substantially as formed as an azeotropic mixture. After completion of the reaction, the remaining solvent and excess amine, if employed, are removed by distillation and the Schiff base recovered as residue. The latter may be purified by conventional means such as by distillation, if desired.

In the second step of the reaction, the Schiff base and a nitromethane compound are mixed together in a substantially anhydrous lower alkanoic acid such as acetic, propionic or butyric acid. Substantially equimolar proportions of the Schiff base and nitromethane compound and a molar excess of the alkanoic acid are employed. The preferred excess of the acid is from 2 to 3 molar excess. The resulting mixture is allowed to stand at room temperature, i. e. from about 20°–40° C., to allow the reaction to proceed. The reaction is usually substantially complete in several hours but the mixture may be allowed to stand for several days without detriment. The desired product frequently precipitates in the reaction mixture. However, a supersaturated solution of the product may be formed and scratching the reaction vessel or seeding the mixture may be necessary to initiate precipitation. Alternatively, the entire mixture may be poured into water to precipitate the desired product. The latter is then recovered by filtration and purified by conventional methods.

The following examples illustrate the invention but are not to be construed as limiting:

*Example 1.—2-chloro-α'-nitrostilbene*

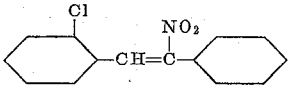

250 grams (1.78 moles) of 2-chlorobenzaldehyde, 200 milliliters (2.03 moles) of normal-butylamine and 250 milliliters of benzene were mixed together and the resulting mixture heated to distill off the water of reaction as a benzene-water azeotrope until no further water distilled. The remaining benzene was distilled off and the residue fractionally distilled to obtain an N-(2-chlorobenzylidene)-normal-butylamine product boiling at 90°–93° C. at 0.05 millimeter pressure.

206 grams (1.05 moles) of the above N-(2-chlorobenzylidene)-normal-butylamine product was poured into a solution of 137 grams (1 mole) of phenylnitromethane in 250 milliliters of glacial acetic acid. The mixture was stirred well and allowed to stand in the dark at room temperature. Crystals started to precipitate within 1 hour and the mixture became a semisolid mass within 2 hours. The mixture was poured into 1 liter of ice-water with stirring. The resulting mixture was allowed to stand 1 hour, then filtered to obtain a 2-chloro-α'-nitrostilbene product. The product was washed with water and recrystallized from alcohol to recover a purified product melting at 90.2°–91.2° C. The yield of the first crop of the recrystallized product amounted to 212.5 grams or 81.8 percent of theoretical.

*Example 2.—2,4-dichloro-α'-nitrostilbene*

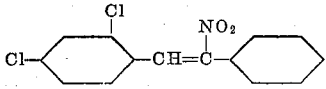

61.3 grams (0.35 mole) of 2,4-dichlorobenzaldehyde, 28.2 grams (0.396 mole) of normal-utylamine and 125 milliliters of benzene were mixed together and the mixture heated to distill off the water of reaction as a benzene-water azeotrope. After completion of the reaction as evidenced by no further formation of water, the remaining benzene and excess amine were distilled off and an N-(2,4-dichlorobenzylidene)-normal-butylamine product obtained as residue.

23.0 grams (0.1 mole) of the above N-(2,4-dichlorobenzylidene)-normal-butylamine product, 13.7 grams (0.1 mole) of phenylnitromethane and 25 milliliters of glacial acetic acid were mixed together and allowed to stand at room temperature. Some heat of reaction was observed. The reaction mixture was allowed to stand for several days at room temperature. At the end of this period, the reaction mixture had turned into a semisolid mass. The mixture was filtered, washed successively with cold glacial acetic acid and water and dried in a vacuum desiccator over calcium chloride to obtain a 2,4-dichloro-α'-nitrostilbene product melting at 121°–123° C. The yield of the product amounted to 24.6 grams or 83.7 percent of theoretical.

*Example 3.—2-fluoro-α'-nitrostilbene*

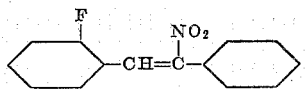

11.4 grams (0.092 mole) of 2-fluorobenzaldehyde was dissolved in 250 milliliters of cyclohexane and 10 milliliters (0.1 mole) of normal-utylamine added thereto. The resulting mixture was heated to codistill the water of reaction with cyclohexane until no further water distilled. A portion of the cyclohexane was then distilled off and to the residue was added 12.4 grams (0.09 mole) of phenylnitromethane and 15 milliliters of glacial acetic acid. The resulting mixture was allowed to stand overnight at room temperature. About 0.5 milliliter of the reaction mixture was removed, the cyclohexane solvent evaporated off and the residue scratched to obtain a crystalline 2-fluoro-α'-nitrostilbene product. The crystals were added to the reaction mixture as seeds to induce crystallization. The seeded reaction mixture was allowed to stand in the refrigerator for several days to complete the precipitation of the product. At the end of this period the product was recovered by filtration, washed with ethanol and air-dried. The product melted at 79°–80° C. and amounted to a yield of 11.4 grams or 51.8 percent of theoretical. The product had a carbon content of 69.12 percent. The theoretical value for the latter is 69.12 percent.

*Example 4.—2,6-dichloro-α-nitrostilbene*

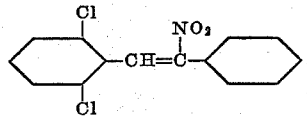

17.5 grams (0.1 mole) of 2,6-dichlorobenzaldehyde, 10 milliliters (0.1 mole) of normal-butylamine and 75 milliliters of benzene were mixed together. The reaction mixture was then heated to distill the water of reaction as a benzene-water azeotrope. The remaining solvent was then distilled off to obtain an N-(2,6-dichlorobenzylidene)-normal-butylamine (Schiff base) product as residue.

The Schiff base thus obtained was then mixed with 13.7 grams (0.1 mole) of phenylnitromethane and 20 milliliters of glacial acetic acid. The mixture was allowed to stand in the dark for several days, then poured into water to precipitate a crystalline solid. The mixture was filtered to obtain a 2,6-dichloro-α'-nitrostilbene product, which after washing with water and recrystallizing from alcohol, melted at 136°–136.5° C. The yield of the first crop of the recrystallized product was 24.4 grams or 83 percent of theoretical.

*Example 5.—2-chloro-α-nitrostilbene*

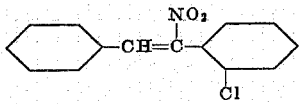

In a manner similar to that described in Example 4, an N-benzylidene-normal-butylamine (Schiff base) product was prepared from 5.3 grams (0.05 mole) of benzaldehyde and 5 milliliters (0.05 mole) of normal-butylamine. 8.6 grams (0.05 mole) of 2-chlorophenylnitromethane and 10 milliliters of glacial acetic acid were added to the Schiff base and the resulting mixture allowed to stand overnight. A drop of the reaction mixture was removed, chilled and scratched to obtain a crystalline solid. The latter was added to the reaction mixture as a seed, whereupon precipitation of the product proceeded immediately. The mixture was cooled to complete the precipitation and then filtered to obtain a 2-chloro-α-nitrostilbene product. The latter was washed with ethanol and recrystallized from ethanol to obtain a purified product melting at 92.8°–93.5° C. The yield of the first crop of the recrystallized product was 7.1 grams or 54.6 percent of theoretical.

*Example 6.—2,2'-dichloro-α-nitrostilbene*

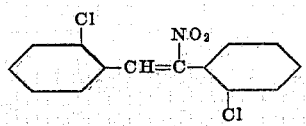

In a manner similar to that described in Example 4, an N-(2-chlorobenzylidene)-normal-butylamine (Schiff base) intermediate was prepared from 7.0 grams (0.05 mole) of 2-chlorobenzaldehyde and 5 milliliters (0.05 mole) of normal-butylamine. 8.6 grams (0.05 mole) of 2-chlorophenylnitromethane and 10 milliliters of glacial acetic acid were added to the Schiff base intermediate and the mixture stirred and then allowed to stand for about 0.5 hour at room temperature. At the end of this period, the reaction mixture was warmed for a few minutes on the steam bath. The reaction mixture was then seeded with crystals prepared in a manner similar to that described in Example 5, whereupon the mixture turned into a semisolid mass. The mixture was cooled in a refrigerator for about 0.5 hour and then filtered to obtain a 2,2'-dichloro-α-nitrostilbene product. The latter was washed with ethanol and recrystallized from ethanol to recover a purified product melting at 120.5°–121.5° C. The yield of the first crop of the recrystallized product amounted to 9.3 grams or 63.3 percent of theoretical.

*Example 7.—2-chloro-2'-ethoxy-α-nitrostilbene*

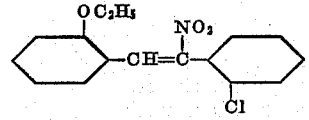

8.6 grams (0.05 mole) of 2-chlorophenylnitromethane was dissolved in 15 milliliters of glacial acetic acid. 10.3 grams (0.05 mole) of N-(2-ethoxybenzylidene)-normal-butylamine (Schiff base) prepared in a manner similar to that described in Example 4, was added thereto and the mixture stirred. After about 5 minutes the reaction vessel was scratched whereupon a precipitate formed. The mixture was allowed to stand for 30 minutes and then poured into an ice-water mixture with stirring. The resulting mixture was filtered to obtain a 2-chloro-2'-ethoxy-α-nitrostilbene product. The latter was washed with water and recrystallized from an ethanol-dioxane mixture to recover a purified product melting at 120°–121° C. The yield of the first crop of the recrystallized product was 11.7 grams or 77 percent of theoretical. The chlorine content of the product was 12.3 percent. The theoretical value is 11.7 percent.

Example 8.—2-chloro-2',α-dinitrostilbene

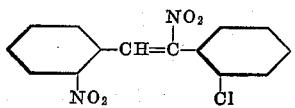

In a manner similar to that described in Example 4, an N-(2-nitrobenzylidene)-normal-butylamine product was prepared from 7.9 grams (0.0513 mole) of 2-nitrobenzaldehyde and 6 milliliters (0.0513 mole) of normal-butylamine. A solution of 8.8 grams (0.0513 mole) of 2-chlorophenylnitromethane in 20 milliliters of glacial acetic acid was added thereto and the mixture heated to a temperature of 125° C. The reaction mixture was allowed to cool somewhat and then poured onto crushed ice whereupon a yellow solid precipitated. After about 0.5 hour, the aqueous dispersion was filtered to recover a solid 2-chloro-2',α-dinitrostilbene product. The latter was washed with water and dried over calcium chloride at reduced pressure. The product was recrystallized from ethanol-dioxane to obtain a purified product melting at 155.8°–156.6° C. The yield of the first crop of the recrystallized product was 11.8 grams or 80.8 percent of theoretical. The chlorine content of the product was 11.7 percent. The theoretical value is 11.6 percent.

Example 9.—2-bromo-α'-nitrostilbene

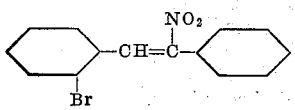

In a manner similar to that described in Example 4, an N-(2-bromobenzylidene)-normal-butylamine product was prepared from 18.5 grams (0.1 mole) of 2-bromobenzaldehyde and 10 milliliters (0.1 mole) of normal-butylamine. A solution of 13.7 grams (0.1 mole) of phenylnitromethane in 20 milliliters of glacial acetic acid was added thereto and the resulting mixture allowed to stand at room temperature for 5.5 hours. At the end of this period, the mixture was seeded with crystals prepared in a manner similar to that described in Example 5, whereupon precipitation of a yellow crystalline product proceeded immediately. After 1.5 hours, the mixture was poured into water to complete the precipitation. The aqueous mixture was then filtered to recover a 2-bromo-α'-nitrostilbene product. The latter was washed with water and dried over calcium chloride at reduced pressure for about 11 hours. The yield of the product was 29.5 grams or 97.1 percent of theoretical. The product after recrystallization from ethanol melted at 91.5°–92.5° C. The bromine content of the product was 26.8 percent. The theoretical value is 26.3 percent.

Example 10.—4-chloro-α'-nitrostilbene

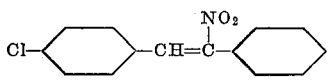

An N-(4-chlorobenzylidene)-normal-butylamine (Schiff base) product was prepared from 14.0 grams (0.1 mole) of 4-chlorobenzaldehyde and 10 milliliters (0.1 mole) of normal-butylamine in a manner similar to that described in Example 4.

13.7 grams (0.1 mole) of phenylnitromethane and 25 milliliters of acetic acid were poured into the Schiff base product with agitation and the resulting mixture allowed to stand at room temperature for 2 hours. A heavy precipitate formed. The desired product was recovered by filtration, washed and recrystallized from ethanol to obtain 4-chloro-α'-nitrostilbene melting at 113°–114° C. The yield of the first crop of the purified product was 19.4 grams or 74.7 percent of theoretical.

Example 11.—2,2',4-trichloro-α'-nitrostilbene

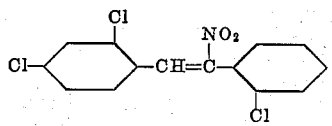

In a similar manner, 23.0 grams (0.1 mole) of N-(2,4-dichlorobenzylidene)-normal-butylamine, 17.4 grams (0.1 mole) of 2-chlorophenylnitromethane and 25 milliliters of glacial acetic acid were mixed together and allowed to stand at room temperature to obtain a 2,2',4-trichloro-α'-nitrostilbene product melting at 90°–91° C.

In a similar manner, the following nitrostilbenes are prepared:

3,4-dichloro-α'-nitrostilbene melting at 110° C. by the reaction of 3,4-dichlorobenzaldehyde with normal-butylamine to obtain the intermediate N-(3,4-dichlorobenzylidene)-normal-butylamine and causing the latter to react with phenylnitromethane in acetic acid solution.

2-chloro-2'-methoxy-α-nitrostilbene melting at 120°–121° C. by the reaction of 2-methoxybenzaldehyde with normal-butylamine to obtain the intermediate N-(2-methoxybenzylidene)-normal-butylamine and causing the latter to react with 2-chlorophenylnitromethane in acetic acid solution.

4-bromo-α'-nitrostilbene having a moleular weight of 304.2 by the reaction of 4-bromobenzaldehyde with normal-butylamine to obtain the intermediate N-(4-bromobenzylidene)-normal-butylamine and causing the latter to react with phenylnitromethane in acetic acid solution.

2-4'-dibromo-α'-nitrostilbene having a molecular weight of 383.1 by the reaction of N-(2-bromobenzylidene)-normal-butylamine with 4-bromophenylnitromethane in acetic acid solution.

4-bromo-2'-chloro-α'-nitrostilbene having a molecular weight of 338.6 by the reaction of N-(4-bromobenzylidene)-normal-butylamine with 2-chlorophenylnitromethane in acetic acid solution.

4-bromo-2',4'-dichloro-α-nitrostilbene having a molecular weight of 417.5 by the reaction of 2,4-dichlorobenzaldehyde with normal-butylamine to form N-(2,4-dichlorobenzylidene)-normal-butylamine and causing the latter to react with 4-bromophenylnitromethane in acetic acid solution.

2-chloro-2'-fluoro-α-nitrostilbene having a molecular weight of 277.7 by the reaction of N-(2-fluorobenzylidene)-normal-butylamine with 2-chlorophenylnitromethane.

4-fluoro-α-nitrostilbene having a molecular weight of 242.2 by the reaction of N-benzylidene-normal-butylamine with 4-fluorophenylnitromethane.

2-chloro-2'-fluoro-α'-nitrostilbene melting at 84.5°–85.5° C. by the reaction of N-(2-chlorobenzylidene)-normal-butylamine with 2-fluorophenylnitromethane.

3-bromo-α-nitro-4'-phenylstilbene having a molecular weight of 380.3 by the reaction of N-(4-phenylbenzylidene)-normal-butylamine with 3-bromophenylnitromethane.

4-chloro-4'-isopropyl-α-nitrostilbene having a molecular weight of 301.8 by the reaction of N-(4-isopropylbenzylidene)-normal-amylamine with 4-chlorophenylnitromethane.

4-iodo-α'-nitrostilbene having a molecular weight of 351.2 by the reaction of N-(4-iodobenzylidene)-normal-hexylamine with phenylnitromethane.

3,5-dibromo-2-methoxy-α'-nitrostilbene having a molecular weight of 413.1 by the reaction of N-(3,5-dibromo-2-methoxybenzylidene)-normal-propylamine with phenylnitromethane.

2,2'-dichloro-6-fluoro-α' nitrostilbene having a molecular weight of 312.2 by the reaction of N-(2-chloro-6-fluorobenzylidene)-normal-butylamine with 2-chlorophenylnitromethane.

2-bromo-2'-chloro-α,5'-dinitrostilbene having a molecular weight of 383.6 by the reaction of N-(2-chloro-5-nitrobenzylidene)-normal-amylamine with 2-bromophenylnitromethane.

3-chloro-4'-ethoxy-5'-methoxy-α,2'-dinitrostilbene having a molecular weight of 346.8 by the reaction of N-(4-ethoxy-5-methoxy-2-nitrobenzylidene)-normal-propylamine with 3-chlorophenylnitromethane.

The products of this invention contain reactive centers and are useful as chemical intermediates in the synthesis of other compounds such as for example, aralkylamines, and compounds used as dyes and medicinals. In addition, these compounds are adapted to be employed as toxic constituents in germicidal and parasiticidal compositions. They are particularly useful as agricultural fungicides. In a representative operation, essentially complete protection against lesions of tomato early blight disease was obtained when tomato plants treated with spray compositions containing 0.25 pound of 2-bromo-α'-nitrostilbene per 100 gallons of ultimate composition were inoculated with spores of the causative organism, *Alternaria solani*, and the inoculated plants maintained under conditions optimum for development of the disease.

In another operation, complete protection against infection by *Puccinia graminis-tritici* was obtained when wheat plants were sprayed with a toxicant composition containing 0.25 pound of 2-bromo-α'-nitrostilbene per 100 gallons of ultimate composition.

In addition, these compounds may be employed for the control of plant infesting insects and mites. In a representative operation, good controls were obtained when bean plants infested with mites (*Tetranychus bimaeulatus*) were dipped or sprayed with aqueous dispersions containing as toxic ingredient 2-fluoro-α'-nitrostilbene.

Certain of the Schiff bases employed in the synthesis of the halonitrostilbenes of the present invention are described and claimed in copending applications by Dale N. Robertson, filed concurrently herewith as Serial Nos. 616,659 and 616,654.

The nitromethane compounds employed as starting materials in the preparation of the halonitrostilbenes of this invention may be prepared by reacting an appropriate benzyl bromide having the structure R'CH$_2$Br with sodium nitrite in a solvent such as dimethylformamide at a temperature of from −20° to −15° C. for several hours. The fluorophenylnitromethanes employed in the preparation of certain of the halonitrostilbenes of the present invention are described and claimed in a copending application by Dale N. Robertson, filed concurrently herewith as Serial No. 616,655.

A preferred method for preparing the compounds of the present invention is the subject of a copending application filed concurrently herewith as Serial No. 616,652, of Dale N. Robertson.

I claim:
1. A halonitrostilbene having the structure

$$\text{R—CH}=\overset{\text{NO}_2}{\underset{|}{\text{C}}}\text{—R}'$$

wherein R and R' each represents a member of the group consisting of the aryl and haloaryl radicals of the benzene series, and wherein at least one of R and R' represents a haloaryl radical.
2. 2-chloro-α'-nitrostilbene.
3. 2-chloro-α-nitrostilbene.
4. 2,2',4-trichloro-α-nitrostilbene.
5. 2-fluoro-α'-nitrostilbene.
6. 2-bromo-α'-nitrostilbene.

No references cited.